United States Patent [19]

Johnson et al.

[11] 4,309,311
[45] Jan. 5, 1982

[54] AMMONIA SYNTHESIS WITH CATALYST DERIVED BY HEATING ON A SUPPORT A SALT SELECTED FROM ALKALI METAL, ALKALINE EARTH METAL, IRON AND COBALT HEXACYANOCOBALTATES AND HEXACYANORUTHENATES

[75] Inventors: Marvin M. Johnson; Donald C. Tabler; Gerhard P. Nowack, all of Bartlesville, Okla.

[73] Assignee: Phillips Petroleum Company, Bartlesville, Okla.

[21] Appl. No.: 110,303

[22] Filed: Jan. 8, 1980

[51] Int. Cl.³ .................. B01J 27/24; C01C 1/04; C01C 3/11; C01C 3/12
[52] U.S. Cl. .................. 252/438; 423/362; 423/363; 423/364; 423/367
[58] Field of Search ............ 423/362, 363, 364, 367; 252/438

[56] References Cited

U.S. PATENT DOCUMENTS

| | | | |
|---|---|---|---|
| 1,119,534 | 12/1914 | Pier | 423/363 |
| 1,352,180 | 9/1920 | Clancy | 423/363 |
| 3,678,085 | 7/1972 | Rick et al. | 423/367 |
| 3,904,737 | 9/1975 | Paris et al. | 423/367 |
| 3,909,247 | 9/1975 | Paris et al. | 423/364 |
| 4,163,775 | 8/1979 | Foster et al. | 423/362 |

FOREIGN PATENT DOCUMENTS

| | | |
|---|---|---|
| 44-845 | 1/1969 | Japan . |
| 394306 | 12/1973 | U.S.S.R. . |
| 558863 | 12/1977 | U.S.S.R. . |

OTHER PUBLICATIONS

Simon et al., "Preparation and Structure of Barium Decacyanodicobaltate (II) Tridecahydrate", $Ba_3[Co_2(CN)_{10}]\cdot 13\ H_2O$, Sterechemical Analysis of the Metal—Metal Bonded$[Co_2(CN)_{10}]^{6-}$ Dimer, Journal of the American Chemical Society, 94:22, (Nov. 1, 1972), pp. 7654-7663.

*Primary Examiner*—O. R. Vertiz
*Assistant Examiner*—Wayne A. Langel

[57] ABSTRACT

Synthesis of ammonia employing at least one salt selected from alkali metal-, an alkaline earth metal-, iron- and cobalt hexacyanocobaltate and hexacyanoruthenate on a suitable support and then heating the composition to provide it with suitable activity.

6 Claims, No Drawings

AMMONIA SYNTHESIS WITH CATALYST DERIVED BY HEATING ON A SUPPORT A SALT SELECTED FROM ALKALI METAL, ALKALINE EARTH METAL, IRON AND COBALT HEXACYANOCOBALTATES AND HEXACYANORUTHENATES

BRIEF SUMMARY OF THE INVENTION

Ammonia is synthesized at relatively lower temperature employing a catalyst prepared by adding to a suitable support a salt selected from at least one of an alkali metal, an alkaline earth metal, iron and cobalt hexacyanocobaltates and hexacyanoruthenates and then heating to activate a composition thus obtained to provide it with suitable activity to catalyze the synthesis.

DETAILED DESCRIPTION

This invention relates to the synthesis of ammonia. It also relates to the provision of a catalyst for the synthesis of ammonia. In one of its aspects the invention relates to the synthesis of ammonia at a relatively lower temperature as herein further described.

In one of its concepts the invention provides a process for ammonia synthesis which comprises subjecting nitrogen and hydrogen under ammonia synthesis condition to the action of a catalyst as herein described. In another of its concepts the invention provides the catalyst obtained by activating upon a suitable support a salt selected from at least one of an alkali metal, an alkaline earth metal, iron and cobalt hexacyanocobaltates and hexacyanoruthenates. A further concept of the invention provides an ammonia synthesis, employing a catalyst as herein described, conducted at a temperature in the approximate range of about 385° C. to about 460° C., although the catalyst is active for the synthesis at both substantially lower and higher temperatures, (about 725° F. to about 860° F.) e.g., from about 260° C. to about 590° C.

Current Ammonia Synthesis Technology uses a fused iron-alkali oxide catalyst, pressures from 100 to 1000 atmospheres, and temperatures about 900° F. to 950° F. Even with these extreme conditions, the per pass conversions are only 8 to 20 percent, with the exception of the Claude Process (1000 atm Pressure), which gives a 45% per pass conversion. Obviously, these processes are very expensive in terms of energy consumption. Now that energy is becoming increasingly expensive, it has become important to search for catalysts which will do the ammonia synthesis at lower temperatures and pressures.

As known, heat is evolved in ammonia synthesis. Thus the higher the temperature the more the chemical equilibrium tends to shift, so to speak, to the left. In other words, equilibrium is displaced to the left by raising the temperature. To make possible the use of low temperatures, it is required that the catalyst have sufficient activity to effect reaction between hydrogen and nitrogen.

We have found a number of catalysts, which we have prepared, which are active to catalyze the synthesis of ammonia from hydrogen and nitrogen at relatively lower temperatures.

Accordingly, it is an object of this invention to provide a process for the synthesis of ammonia. Another object of the invention is to provide a process for the synthesis of ammonia at relatively lower temperatures. A further object of the invention is to provide a catalyst which will synthesize ammonia from hydrogen and nitrogen at relatively lower temperatures.

Other aspects, concepts, objects, and several advantages of the invention are apparent from study of this disclosure and the appended claims.

According to the present invention, there is provided a process for the synthesis of ammonia from hydrogen and nitrogen in which there is employed a composition comprising on a suitable support a salt selected from at least one of an alkali metal, an alkaline earth metal, iron and cobalt hexacyanocobaltates and hexacyanoruthenates, the composition having been heated in a manner to activate same for ammonia synthesis at a relatively lower temperature i.e., at a temperature in the range of from about 725° F. to about 860° F.

Salts or compounds which have been found suitable to prepare the composition of the invention by adding these to a support and then activating include the following:

1. $K_4[Co(CN)_6]$  Potassium hexacyanocobaltate(II)
2. $K_3[Co(CN)_6]$  Potassium hexacyanocobaltate(III)
3. $Ca_3[Co(CN)_6]_2$  Calcium hexacyanocobaltate(III)
4. $Na_4[Ru(CN)_6]$  Sodium hexacyanoruthenate(II)
5. $K_4[Ru(CN)_6]$  Potassium hexacyanoruthenate(II)
6. $Rb_4[Ru(CN)_6]$  Rubidium hexacyanoruthenate(II)
7. $Cs_4[Ru(CN)_6]$  Cesium hexacyanoruthenate(II)
8. $Mg_2[Ru(CN)_6]$  Magnesium hexacyanoruthenate(II)
9. $Ca_2[Ru(CN)_6]$  Calcium hexacyanoruthenate(II)
10. $Ba_2[Ru(CN)_6]$  Barium hexacyanoruthenate(II)
11. $Fe_2[Ru(CN)_6]$  Iron hexacyanoruthenate(II)
12. $Co_2[Ru(CN)_6]$  Cobalt hexacyanoruthenate(II)

As evident from a study of this disclosure some of the foregoing compounds have been known.

Thus catalysts that have been found to be particularly active for the formation of ammonia from its elements, are prepared employing on a suitable support to produce a composition which is later activated salts of cyano complexes of cobalt and ruthenium; in particular salts of groups Ia and IIa of the periodic table of the elements with both transition metals and, with a cyano complex of ruthenium, a cobalt salt. Mixtures of the salts are included as well as use of both the cobalt and ruthenium in preparing the salts.

Catalysts are prepared from said salts supported on refractory oxides such as activated alumina, silica gel, titania, magnesia, zirconia, zinc titanate, kieselguhr, pumice, and the like, wherein an extended surface is available to increase the effectiveness of the catalyst.

Cyano complexes can be applied to the support by impregnation with a solution in which they are dissolved. Water is a suitable solvent for some of the salts listed above. If the complex is relatively insoluble in available solvents it can be applied to the support by precipitating it from solutions that contain appropriate ions, i.e., a solution of the desired cation and a solution of hexacyanocobalt or hexacyanoruthenium, by combining the solutions in the presence of the support. Neither of these solutions should contain compounds of sulfur or phosphorus because they reduce the activity of the resulting catalyst. It is preferable that they do not contain halogen compounds which are generally corrosive to process equipment. When the cyano complex is made by precipitation as described here it is not necessary to separate the solid phase (precipitate and support) from the liquid phase.

After the cyano complex and the support have been combined, either by impregnation or by precipitation, solvent is removed by evaporation and the residual solid is usually converted to the active catalytic form by heating in an atmosphere comprising hydrogen. Some of the hydrogen may be replaced by a material or gas which produces a desired activating or inert atmosphere. Heating must attain a temperature at least hot enough to decompose the cyano complex and remove essentially all of the contained nitrogen as determined by x-ray photoelectron spectroscopy. It can be to at least 475° C. Preferably, however, the catalyst is heated to about 325°–430° C. for a time sufficient to produce an active catalyst. This may be from 0.1 to 10 hours, or even longer. Generally a time of 0.5 to 2 hours is suitable.

The chemical nature of the activated catalyst is not known; although essentially all of the nitrogen has been removed it is not known whether the accompanying carbon is also removed during activation. In addition the form of the Group Ia or IIa elements after activation is also unknown. And, when the cyano complex is formed by precipitation, other elements that were present initially will also affect the nature of the activated catalyst. Because of this uncertainty the concentration of catalyst on support cannot be defined in terms of compounds actually present. However, the composition that comprises the cyano complex plus the support, before activation but calculated on an anhydrous (or solvent-free) basis, should contain between about one to about 15 weight percent of cobalt and/or ruthenium, at least one of which is present as the hexacyano complex.

Process

Mixtures of nitrogen and hydrogen are used to synthesize ammonia. The stoichiometric composition of 3 hydrogen:nitrogen is preferred, but the composition can range from 0.3–30 volumes of hydrogen per volume of nitrogen.

The temperature at which ammonia can be made can range between about 260°–590° C. However, preferably, according to the invention, the temperature will be between about 385°–450° C. This is lower, significantly lower, than that of present commercial technology.

Ammonia synthesis can be effected at pressures between about $10^5$ to $10^8$ Pa. Preferably reactant pressure will range between about $2 \times 10^6$ to $8 \times 10^6$ Pa.

Contact time of reactants with the catalyst, expressed as volumes of gas at standard conditions per unit volume of catalyst per hour (GHSV) can range from as low as 100 to about 5000. Preferably the gas hourly space velocity will be between about 500–2000.

Preparation of nine different catalysts illustrative of this invention, together with an iron-containing catalyst, and results from runs in which they were used to synthesize ammonia, are described in the following examples.

EXAMPLE I

Catalysts prepared by impregnation. Catalyst A was prepared by adding a solution of 3.43 g $K_4[Ru(CN)_6]\cdot3H_2O$ (from Alfa division of Ventron Corp.) in 9.0 mL of water to 8.0 g (21 mL) of silica gel. The gel absorbed nearly all the solution. This was dried in an oven for 2.5 hr. at 110° C.

Catalyst B was prepared by adding a solution of 3.5 g $Ca_2[Fe(CN)_6]\cdot xH_2O$ (from Henry Bower Chem. Mfg. Co.) in 9.0 mL of water to 8.0 g of silica gel. This was dried in an oven for 4 hr. at 110° C.

Catalyst C was prepared by adding a solution of 3.5 g of $K_4[Ru(CN)_6]\cdot3H_2O$ in 11 mL of water to 15.7 g of −10+40 mesh Harshaw alumina having a surface area of about 200 $m^2/g$. This was dried in an oven for 3 hr. at 110° C.

Catalyst D was prepared by adding a solution of 3.66 g of $K_3[Co(CN)_6]$ (from Pfaltz and Bauer) in 9.0 mL of water to 12.2 g of the same kind of alumina that was used to make catalyst C. This was dried in an oven for 4 hr. at 110° C.

Catalyst E was prepared by adding 13 mL of a solution that was calculated to contain 104 g of calcium hexacyanocobaltate(III) per liter of solution to 18.0 g of −10+40 mesh Norton alumina having a surface area of about 20 $m^2/g$. (The solution of calcium hexacyanocobaltate was prepared by neutralizing the appropriate acid with calcium carbonate as follows. A column containing 51 g of the hydrogen form of cation exchange resin ANGC-244 (from J. T. Baker Chem. Co.) was washed with distilled water until the effluent was neutral to pH indicator paper. A solution containing 12.5 g of $K_3[Co(CN)_6]$ in 125 mL of water was poured through the resin in about 15 minutes; the column was washed with 65 mL water which was added to original eluent. About 7.7 g of calcium carbonate was added to this solution; vigorous evolution of $CO_2$ followed. After warming and stirring for about an hour the undissolved calcium carbonate was removed by filtration; it weighed 2.0 g after drying. The solution was further evaporated to 100 mL total volume.). After stirring to distribute the liquid the mixture was dried in an oven for one hour at 105° C.

Catalyst F was prepared just as catalyst E was but contained about three times as much metal. 12.0 mL of the $Ca_3[Co(CN)_6]_2$ solution described above was added to 17.0 g of the same kind of alumina that was used to make catalyst E. The mixture was dried in an oven for 1.5 hr. at 105° C. The process of adding cobalt solution and drying was repeated twice more.

EXAMPLE II

Catalysts prepared by acid neutralization, then impregnation.

Three catalysts were prepared from hexacyanoruthenic acid made as follows. A column containing 13.5 g of the hydrogen form of cation exchange resin ANGC-244 was washed with water until the effluent was neutral. A solution of 3.0 g $K_4[Ru(CN)_6]\cdot3H_2O$ in 10 ml of water was applied to the column. The column was rinsed with water until eluent was no longer strongly acidic. About 50 mL of eluent containing hexacyanoruthenic acid was collected. It was divided into three equal parts and used to make catalysts G, H, and J.

Catalyst G was prepared by adding 0.5 g $CaCO_3$ to the solution of acid. After effervescence had ceased this solution was added to 11 g of silica gel. This was then dried in an oven.

Catalyst H was prepared by adding 1.4 g $Ba(OH)_2\cdot8H_2O$ to the solution of acid. This was sufficient to make the solution basic; it was poured over 11 g of silica gel, mixed, and dried in an oven.

Catalyst J was prepared by adding 0.5 g $CaCO_3$ to the solution of acid. After effervescence had ceased this solution was added to 17 g of the same kind of alumina that was used to make catalyst E. This was then dried in an oven.

EXAMPLE III

Catalyst prepared by precipitation onto a support.

Catalyst K was prepared as follows. To a solution of 3.4 g (0.0137 moles) of $Co(C_2H_3O_2)_2 \cdot 4H_2O$ in 50 mL water containing 0.7 mL glacial acetic acid 20 g of powdered Catapal alumina, having a surface area of 268 $m^2/g$, was added. A solution containing 3.2 g (0.0068 moles) of $K_4[Ru(CN)_6] \cdot 3H_2O$ in 30 mL of water was added to the cobalt acetate-alumina slurry, then 1.3 mL glacial acetic was added. This produced a smooth slurry that set to a firm gel within a few minutes. This gel was dried in an oven overnight at 110° C.

EXAMPLE IV

All 10 catalysts whose preparation has been described in Examples I–III were used in runs to make ammonia from a hydrogen-nitrogen mixture. These were made using a ½-inch schedule 40 stainless steel pipe reactor containing 22.5 mL of catalyst. The reactor was heated in a temperature controlled electric furnace. All runs were made at $1.76 \times 10^6$ Pa (255 psia) using a premixed feed containing 50 mole percent each of hydrogen and nitrogen. After placing the indicated volume of catalyst in the reactor it was heated to about 425° C. in a stream of pure hydrogen for about an hour at $1.76 \times 10^6$ Pa. Hydrogen was replaced with the ammonia synthesis gas and, after reactor temperature and pressure had been established an approximately one hour run was made in which reactor effluent was contacted with a solution of standardized acid to absorb ammonia. At the conclusion of the run excess acid was back-titrated with standard caustic using brom cresol green indicator. Effluent from the acid scrubber was measured with a wet test gas meter, then vented. Total effluent volume was the sum of this observed volume and the calculated volume of the ammonia removed in the scrubber. Table I contains results from runs with these catalysts. It presents the concentration of ammonia gas in the reactor effluent and also expresses this as "Percent of Equilibrium" that were calculated from chemical reaction equilibrium constants from the International Critical Tables, 7, 239. Table I also contains the temperature and feed rate for the run, and shows the concentration of the Group VIII element (Fe, Co, Ru) calculated on the basis of the anhydrous catalyst before activation in hydrogen at elevated temperature.

TABLE I

| Catalyst | Group VIII Element, Wt. % | Temp., °C | GHSV | Ammonia Mole % in Product | % of Equil. |
|---|---|---|---|---|---|
| A | Ru, 6.48 | 430 | 989 | 3.58 | 110. |
| B | Fe, 3.95 | 428 | 1111 | 1.27 | 38.0 |
| C | Ru, 3.96 | 428 | 1008 | 3.52 | 105. |
| D | Co, 4.10 | 428 | 1045 | 1.82 | 54.2 |
| E | Co, 1.50 | 429 | 1114 | 1.13 | 34.2 |
| F | Co, 3.85 | 436 | 1200 | 3.10 | 103. |
| G | Ru, 2.64 | 433 | 1174 | 1.83 | 57.9 |
| H | Ru, 1.79 | 429 | 1214 | 2.50 | 75.8 |
| J | Ru, 1.70 | 427 | 1140 | 2.51 | 73.8 |
| K | Co, 3.55 | 433 | 1059 | 1.02 | 32.3 |
|   | Ru, 3.06 |   |   |   |   |

Catalyst B is active for ammonia synthesis but produced a smaller yield than all catalysts except E and K. Catalyst E contains less than half the concentration of Group VIII metal compared to catalyst B. It is not known why the combination of two active elements—cobalt and ruthenium—in catalyst K did not exhibit higher activity. These runs show that silica and three different aluminas are suitable supports for the catalysts of this invention.

Reasonable variation and modification are possible within the scope of the foregoing disclosure and the appended claims to the invention the essence of which is that compositions prepared from certain salts as described, some of them not heretofore known, have been prepared by adding the salts to a suitable support and then heating the composition thus obtained under conditions suitable to produce an ammonia synthesis catalyst which is effective at relatively lower temperatures than those of presently known commercial technology about 900° F. to 950° F.; and that a process employing such catalysts at a temperature from about 725° F. to about 860° F. has been set forth.

We claim:

1. A composition which can be heated at a temperature within the approximate range 325°–430° C. to activate the same to render it effective for ammonia synthesis at a relatively low temperature in the range 385°–460° C. which comprises on a suitable support at least one salt selected from the group consisting of an alkali metal hexacyanocobaltate, an alkaline earth metal hexacyanocobaltate, an alkali metal hexacyanoruthenate, an alkaline earth metal hexacyanoruthenate, iron hexacyanocobaltate, iron hexacyanoruthenate, cobalt hexacyanocobaltate and cobalt hexacyanoruthenate.

2. A composition according to claim 1 wherein the support is a refractory oxide.

3. A composition according to claim 2 wherein the refractory oxide is selected from the group consisting of activated alumina, silica gel, titania, magnesia, zirconia, zinc titanate, kieselguhr and pumice, each of said oxides having an extended surface available to increase effectiveness of the ultimate catalyst.

4. A catalyst composition according to claim 1 wherein the composition has been heated in an atmosphere of hydrogen until essentially all of the nitrogen has been removed from the composition.

5. A process for preparing a catalyst effective for ammonia synthesis from nitrogen and hydrogen which comprises heating a composition according to claim 1 in an atmosphere of hydrogen until essentially all of the nitrogen has been removed from the composition.

6. As a new compound a salt selected from the group consisting of the following:

| | |
|---|---|
| $Ca_3[Co(CN)_6]_2$ | Calcium hexacyanocobaltate(III) |
| $Na_4[Ru(CN)_6]$ | Sodium hexacyanoruthenate(II) |
| $Rb_4[Ru(CN)_6]$ | Rubidium hexacyanoruthenate(II) |
| $Cs_4[Ru(CN)_6]$ | Cesium hexacyanoruthenate(II) |
| $Mg_2[Ru(CN)_6]$ | Magnesium hexacyanoruthenate(II) |
| $Ca_2[Ru(CN)_6]$ | Calcium hexacyanoruthenate(II) |
| $Ba_2[Ru(CN)_6]$ | Barium hexacyanoruthenate(II) |
| $Fe_2[Ru(CN)_6]$ | Iron hexacyanoruthenate(II) |
| $Co_2[Ru(CN)_6]$ | Cobalt hexacyanoruthenate(II). |

* * * * *